US009981401B2

(12) United States Patent
Kim

(10) Patent No.: US 9,981,401 B2
(45) Date of Patent: May 29, 2018

(54) APPARATUS USING ELECTROCHEMICAL DISCHARGE MACHINING PROCESS AND METHOD USING THE SAME

(71) Applicant: Foundation of Soongsil University-Industry Cooperation, Seoul (KR)

(72) Inventor: Bohyun Kim, Seoul (KR)

(73) Assignee: Foundation of Soongsil University-Industry Cooperation, Seoul (KR)

(*) Notice: Subject to any disclaimer, the term of this patent is extended or adjusted under 35 U.S.C. 154(b) by 497 days.

(21) Appl. No.: 14/872,351

(22) Filed: Oct. 1, 2015

(65) Prior Publication Data

US 2016/0151849 A1 Jun. 2, 2016

(30) Foreign Application Priority Data

Nov. 27, 2014 (KR) ........................ 10-2014-0167666
Dec. 29, 2014 (KR) ........................ 10-2014-0192650

(51) Int. Cl.

| | |
|---|---|
| ***B23H 5/02*** | (2006.01) |
| ***B23H 5/00*** | (2006.01) |
| ***B23H 7/28*** | (2006.01) |
| ***B26F 1/28*** | (2006.01) |

(52) U.S. Cl.

CPC ................ *B26F 1/28* (2013.01); *B23H 5/02* (2013.01); *B23H 7/28* (2013.01); *B23H 5/00* (2013.01)

(58) Field of Classification Search

CPC ............... B23H 7/28; B23H 5/00; B23H 5/02
See application file for complete search history.

(56) References Cited

U.S. PATENT DOCUMENTS

2005/0109634 A1* 5/2005 Mielke .................... B23H 7/26 205/686
2009/0001053 A1* 1/2009 Luo ......................... B23H 1/04 219/69.15

FOREIGN PATENT DOCUMENTS

JP 2009-255243 A 11/2009
KR 2002-0087258 A 11/2002
KR 10-1087989 B1 12/2011

* cited by examiner

*Primary Examiner* — Nicholas A Smith
(74) *Attorney, Agent, or Firm* — Novick, Kim & Lee, PLLC; Sang Ho Lee

(57) ABSTRACT

An apparatus for an electrochemical discharge machining process is provided. The apparatus includes a holder housing having, an inlet hole, an outlet hole, a first side, and a second side, and containing an electrolyte, a tool holder disposed at the first side, and a first electrode having a first end and a second end. The holder housing is configured to sealingly accommodate the electrolyte unless at least one of the inlet hole and the outlet hole is open. The first end is coupled to the tool holder and the second end passes through the second side. Since the apparatus is moved to a machining position of the work-piece by a worker, additional power for controlling the position thereof is not necessary. In addition, the apparatus is easy to carry and use because of its simple structure.

19 Claims, 5 Drawing Sheets

APPARATUS USING ELECTROCHEMICAL DISCHARGE MACHINING PROCESS AND METHOD USING THE SAME

CROSS-REFERENCE TO RELATED APPLICATION

This application claims priority to and the benefit of Korean Patent Application Nos. 2014-0167666 and 2014-0192650, filed on Nov. 27, 2014 and Dec. 29, 2014, respectively, the disclosure of which is incorporated herein by reference in its entirety.

BACKGROUND

The present disclosure relates to a machining apparatus using an electrochemical discharge machining process, and more particularly, to a machining apparatus using an electrochemical discharge machining process using a principle that when a tool electrode is in an electrolyte and a voltage is applied thereto, thermal energy of a spark is generated around the tool electrode and melts a material.

An electrochemical discharge machining process is a method of processing a material using a high thermal energy of a spark generated by a tool through a chemical reaction when an electrode and the tool in an electrolyte are respectively coupled to a positive electrode (+) and a negative electrode (−), and a voltage is applied thereto. The electrochemical discharge machining process is a machining method which causes very little abrasion, and is a machining method suitable to machine nonconductive materials, such as glass or ceramic.

Conventional electrochemical discharge machining apparatuses have a method of controlling a position of a tool electrode using an additional moving unit, and another method of contacting a tool electrode to a work-piece with a constant force using a pulley without a transfer unit.

However, the conventional machining apparatuses need motors and various sensors to control positions of the transferring units, and additionally need various units, such as drivers, to control them. Accordingly, it is difficult to move or carry the machining apparatuses, and there are spatial limitations. In addition, since a work-piece being machined needs to be soaked and machined in an electrolyte tank, in a case that the work-piece is in a large size, it is difficult to machine, and when the work-piece is already installed outside of the apparatus, it is impossible to machine. Thus, to overcome this difficulty, a new apparatus using the electrochemical discharge machining process is required.

SUMMARY OF THE DISCLOSURE

According to one embodiment of the present disclosure, an apparatus for an electrochemical discharge machining process is provided. The apparatus includes a holder housing having, an inlet hole, an outlet hole, a first side, and a second side, and containing an electrolyte, wherein the holder housing is configured to sealingly accommodate the electrolyte therein unless at least one of the inlet hole and the outlet hole is open, a tool holder disposed at the first side, and a first electrode having a first end and a second end, wherein the first end is coupled to the tool holder and the second end passes through the second side.

The apparatus can further include an elastic plate sealingly covering the second side, and a second electrode disposed between the elastic plate and the first side and electrically coupled to a power source. Here, the first electrode fluid-tightly passes through both of the elastic plate and the second electrode.

The holder housing and the second electrode define a space accommodating the electrolyte therein. The first electrode is in contact with the electrolyte and the second electrode. The tool holder includes a wire electrically coupling the first electrode to the power source, and an elastic member configured to apply an elastic force to the first electrode in a longitudinal direction. The longitudinal direction can be the same direction with a direction of gravity. The second end of the first electrode is protruded from the second side in a predetermined distance. The holder housing has a cylindrical shape. The holder housing is a portable holder housing. The holder housing can be made of transparent material.

According to another embodiment of the present disclosure, the method for an electrochemical discharge machining process is provided. The method includes moving a machining apparatus having a holder housing containing an electrolyte therein, a first electrode having a first end and a second end, wherein the first end is disposed inside the holder housing and the second end is protruded from the holder housing, and a second electrode disposed inside the holder housing and being in contact with the first electrode and the electrolyte, and machining a work-piece with the second end of the first electrode. The first electrode and the second electrode are in contact with the electrolyte and are coupled with a power source.

The moving further includes placing the second end of the first electrode at a predetermined position of the work-piece. The machining further includes applying a force to the first electrode in a longitudinal direction. The longitudinal direction can be the same direction with a direction of gravity. The second end of the first electrode is protruded from the holder housing in a first depth, and the machining further includes processing the work-piece for the first depth. The moving further includes relocating the holder housing in a predetermined direction, distance, and/or shape.

The method further includes machining at a first place on the work-piece, moving the holder housing in an opposite direction from a longitudinal direction detaching the second end of the electrode from the work-piece, relocating a location of the holder housing at a second place of the work-piece, and machining at the second place on the work-piece.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Detailed descriptions of the disclosure will be made with reference to the accompanying drawings illustrating specific embodiments of the disclosure as examples. These embodiments will be described in detail such that the disclosure can be performed by those skilled in the art. It should be understood that various embodiments of the disclosure are different but are not necessarily mutually exclusive. For example, a specific shape, structure, and characteristic of an embodiment described herein may be implemented in another embodiment without departing from the scope and spirit of the disclosure. In addition, it should be understood that a position or an arrangement of each component in each disclosed embodiment may be changed without departing from the scope and spirit of the disclosure. Accordingly, there is no intent to limit the disclosure to detailed descriptions to be described below. The scope of the disclosure is defined by the appended claims and encompasses all equivalents that fall within the scope of the appended claims. Like numbers refer to the same or like functions throughout the description of the figures.

Hereinafter, exemplary embodiments of the present disclosure will be described in detail with reference to the accompanying drawings.

Figure 1:
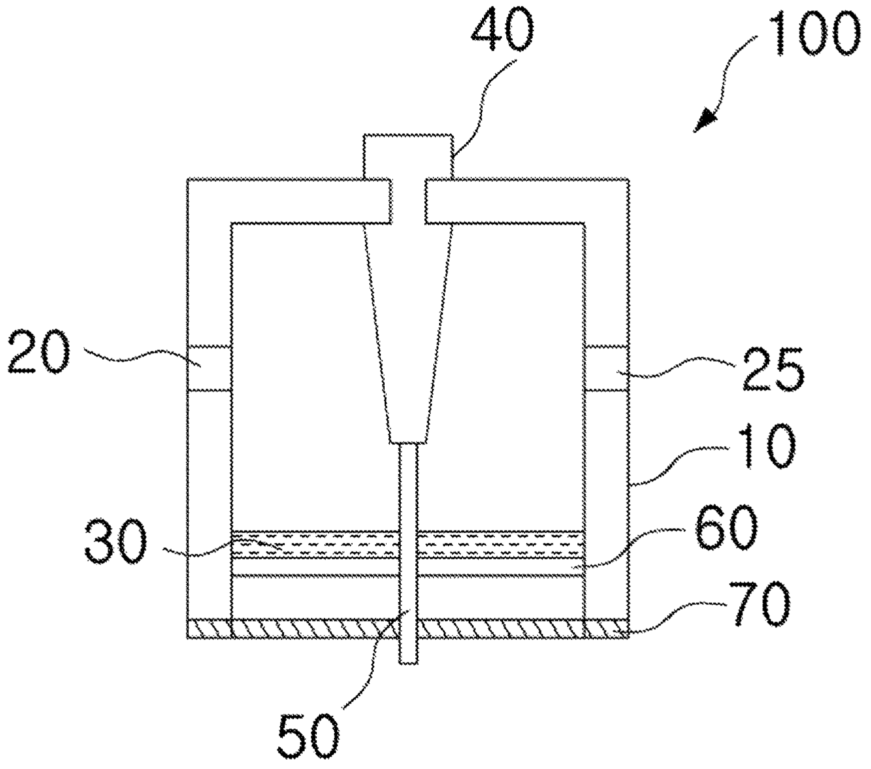
FIG. 1 is a brief cross-sectional view of an electrochemical discharge machining apparatus according to one embodiment of the present disclosure.
Figure 2:
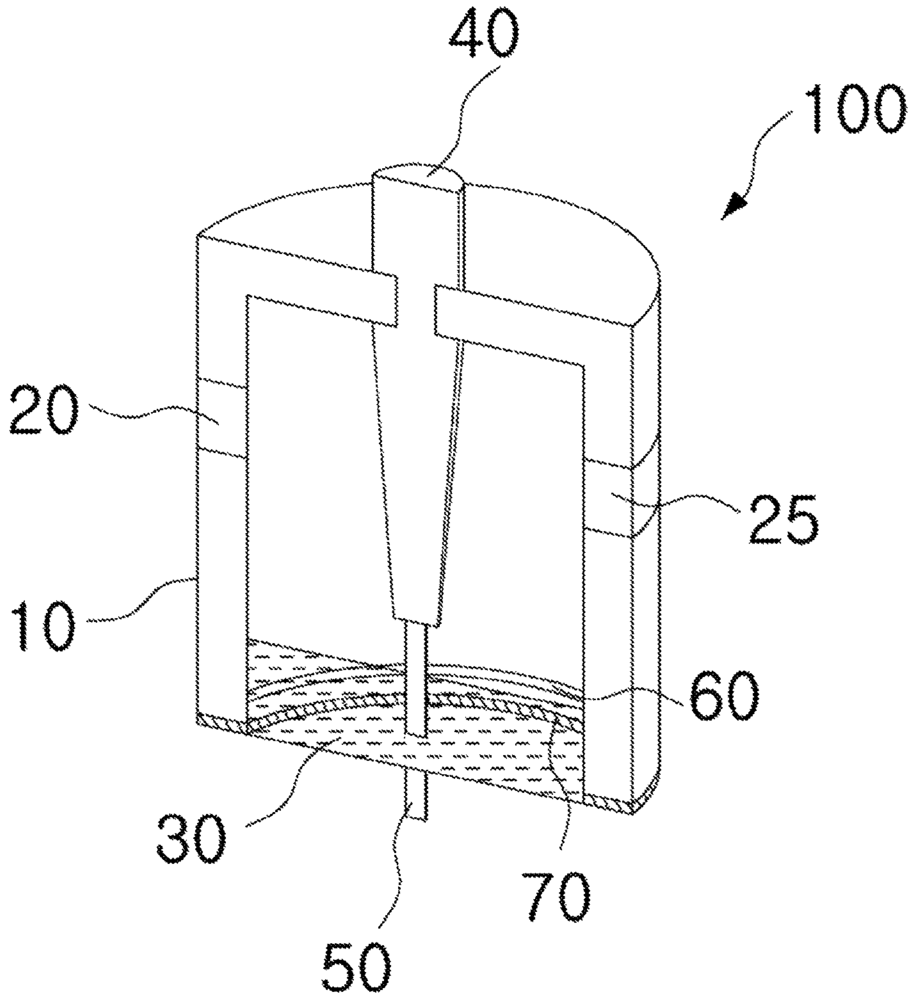
FIG. 2 is a cross-sectional prospective view of for depicting a shape of the electrochemical discharge machining apparatus.

FIG. 1 is a brief cross-sectional view of an electrochemical discharge machining apparatus according to one embodiment of the present disclosure. FIG. 2 is a cross-sectional prospective view of for depicting a shape of the electrochemical discharge machining apparatus.

An electrochemical discharge machining process is a one specific machining method using an electrode effect which occurs during an electrolyte action. When a voltage exceeding a predetermined critical voltage is applied to two electrodes in an electrolyte, an electrical insulator film is formed by a combination of hydrogen gases generated around a cathode. At the moment when the insulator film completely blocks contact between the electrode and the electrolyte, a spark occurs due to a gas discharge, and thus a machining process using thermal energy of the spark may be performed.

An electrochemical discharge machining apparatus 100 may include a holder housing 10 to accommodate an electrolyte 30 in an inner portion thereof to perform the above-describe machining process, a tool holder 40 disposed to the holder housing 10, a tool electrode 50 having one side mounted on the tool holder 40 and another side being exposed outside the holder housing 10, and a counter electrode 60 inserted into a bottom portion of the inner portion of the holder housing 10.

The holder housing 10 may have a cylindrical shape accommodating the electrolyte 30, and be formed in a shape in which the center portion thereof is perforated to hold and mount the tool holder 40. The holder housing 10 may include one or more inlet holes 20 to supply the electrolyte 30 to the inner portion thereof, and with one or more outlet holes 25 for discharging the electrolyte 30 to the outside thereof to control the amount of the electrolyte 30 in the holder housing 10. The holder housing 10 may include the counter electrode 60 and a wire on the bottom surface therein, and a voltage may be applied to the counter electrode 60 through the wire. The holder housing 10 may include an elastic plate 70 at an outer bottom surface. When the machining apparatus 100 contacts to a top surface of a work-piece 90, elastic plate 70 can block the electrolyte 30 leakage at which the tool electrode 50 is exposed to the outside. In addition, the holder housing 10 may include a transparent material, and thus whether an end of the tool electrode 50 of the tool holder 40 is positioned at a machining position 95 of the work-piece 90 as desired may be determined with the naked eye through the holder housing 10, and when the positions are not matched, the machining apparatus 100 may be moved to match the machining position 95 and the end of the tool electrode 50. The holder housing 10 can be in a portable size so that a user can move the holder housing 10 manually. Meanwhile, the tool holder 40 may be inserted into and fixed to a center portion of the holder housing 10. The tool electrode 50 may be mounted on one side of the tool holder 40 to limit horizontal movement of the tool electrode 50, and the tool holder 40 may enable the tool electrode 50 to move vertically or in a longitudinal direction. In addition, since an outer surface of the tool holder 40 is formed of an insulating material, it may not react with the electrolyte 30 while an electrochemical discharge machining process is performed. The tool holder 40 may have a coupling portion therein to couple to one side of the tool electrode 50, and the coupling portion includes a spring (not shown) to apply a force to the tool electrode 50 vertically, and thus the work-piece 90 may be machined as much as a length of the tool electrode 50 exposed to the outside of the holder housing 10.

Meanwhile, an alkaline solution may be used as the electrolyte 30 and be respectively supplied or discharged through the inlet hole 20 and outlet hole 25 of the holder housing 10 using a circulating pump, and a predetermined amount of the electrolyte 30 may be supplied through the inlet hole 20 of the holder housing 10, and when there is too much of the electrolyte 30 in the holder housing 10 or when a machining process is completed, the electrolyte 30 may be discharged through the outlet hole 25 to the outside. In addition, when an electrochemical discharge machining process is performed, the electrolyte 30 may enable a current between the tool electrode 50 and the counter electrode 60 to flow smoothly, so that an electrolyte and a discharge phenomenon may occur.

The tool electrode 50 may have one side mounted on the tool holder 40 inserted into the center portion of the holder housing 10 and the other side exposed to the outside of the holder housing 10, and be connected with the wire provided in the tool holder 40 to be applied with a voltage. The tool electrode 50 may use any one of all conductive materials and be formed of a high thermal resistance material or a high strength metal material, such as tungsten or copper, and the tool electrode 50 may have a variety of shapes, such as a cylinder shape, a knife shape, a tapered shape, or a "V" shape, according to a desired shape to be machined. When the electrochemical discharge machining process is performed, the tool electrode 50 may electrically and chemically react with the counter electrode 60 and as reduction reaction occurs, sparks may be generated at the tool electrode 50, and thus the work-piece 90 may be machined in a shape of the tool electrode 50 using heat generated thereby. The tool electrode 50 may receive a vertical force due to the spring (not shown) from the tool holder 40, and the work-piece 90 may be tightly contacted and machined using the force, and may be machined as much as the length of the tool electrode 50 protruding outside of the holder housing 10.

The counter electrode 60 may be a type of metal that is difficult to dissolve in the electrolyte 30, an alkaline solution, and may use platinum, gold, silver, or the like. The counter electrode 60 may be smaller than or equal to the bottom surface in the holder housing 10 to be inserted into the bottom surface in the holder housing 10, and may be connected with the wire provided in the holder housing 10 to be applied with a voltage. When the electrochemical discharge machining process is performed, the counter electrode 60 may electrically and chemically react with the tool electrode 50, and at this time, an oxidation reaction may occur at the counter electrode 60.

Figure 3:
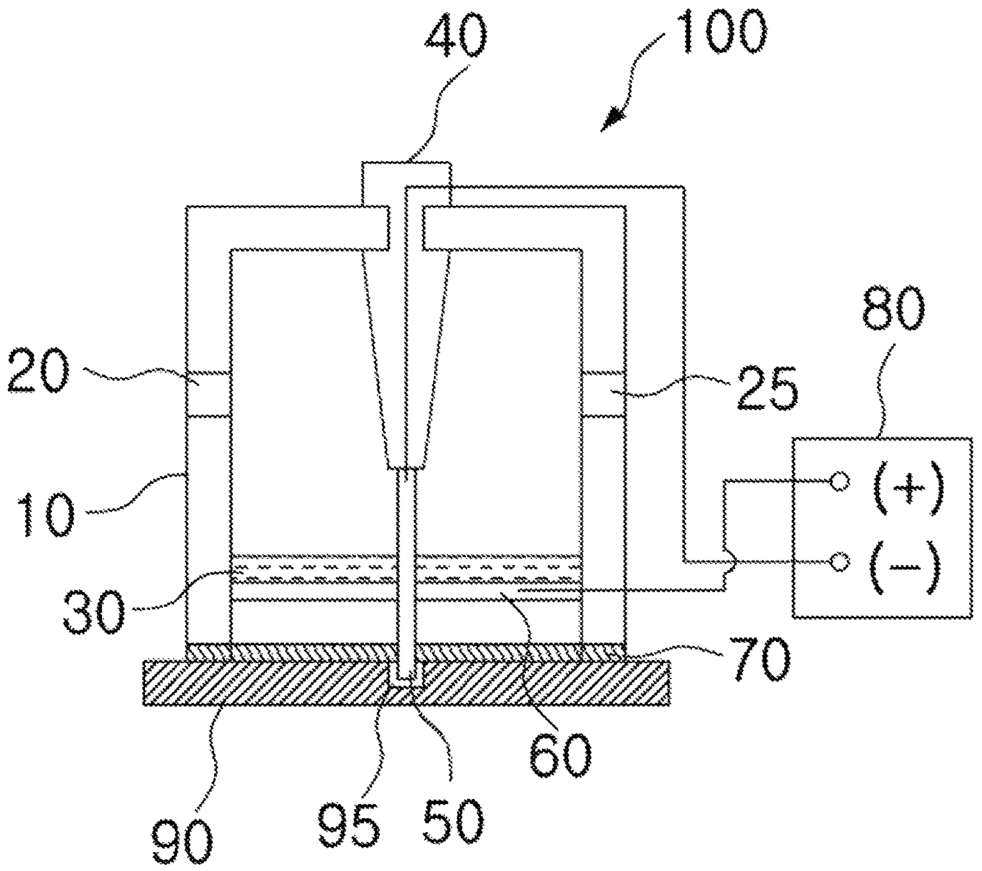
FIG. 3 is a brief cross sectional diagram of the electrochemical discharge machining apparatus according to one embodiment of the present disclosure.

FIG. 3 is a brief cross-sectional diagram of the electrochemical discharge machining apparatus according to one embodiment of the present disclosure.

The tool electrode 50 is prepared according to the desired shape to be machined, and the prepared tool electrode 50 may be mounted on one side of the tool holder 40. Here, the tool electrode 50 may have a variety of shapes, such as a cylinder shape, a knife shape, or a tapered shape.

The tool holder 40, in which the tool electrode 50 is mounted, is inserted into and coupled to the center portion of the holder housing 10, and thus the tool holder 40 may be moved therewith when the holder housing 10 is moved to the machining position 95 of the work-piece 90.

In addition, the tool holder 40 may machine the work-piece 90 as much as the length of the tool electrode 50 protruding outside of the holder housing 10 using an inner spring (not shown) of the tool holder 40.

The machining apparatus 100 in which the holder housing 10 and the tool holder 40 are coupled is moved to the machining position 95 of the work-piece 90, and the end of the tool electrode 50 which is exposed to the outside of the holder housing 10 may be contacted to the machining position 95 of the work-piece 90.

Further, the electrolyte 30 is supplied in the holder housing 10 through the inlet hole 20 of the holder housing 10, and the tool electrode 50 and the counter electrode 60 are submerged in the supplied electrolyte 30. When the electrolyte 30 is completely supplied, the inlet hole 20 may be sealed, and thus the electrolyte 30 inside the holder housing 10 may be prevented from leaking to the outside.

At this time, the electrolyte 30 may be prevented from leaking through a portion of the holder housing 10 from which the tool electrode 50 is exposed to the outside of the holder housing 10 by the elastic plate 70 provided at the outer bottom surface of the holder housing 10.

Meanwhile, one sides of the tool electrode 50 and the counter electrode 60 are submerged in the electrolyte 30 supplied through the inlet hole 20, and the other sides are electrically connected through the wire of a power supplier 80. The power supplier 80 may apply a negative voltage (−) to the tool electrode 50 and a positive voltage (+) to the counter electrode 60 to perform an electrochemical discharge machining process, the reduction reaction which generates hydrogen gas may occur at the tool electrode 50, and the oxidation reaction may occur at the counter electrode 60.

At this time, when the voltage applied from the power supplier 80 is increased, the electrical insulator film may be formed through the combination of hydrogen gases generated at the tool electrode 50, the formed insulator film may completely block contact between the tool electrode 50 and the electrolyte 30 to generate a spark by gas discharge, and the tool electrode 50 may machine the work-piece 90 using the heat of the generated spark.

Figure 4:
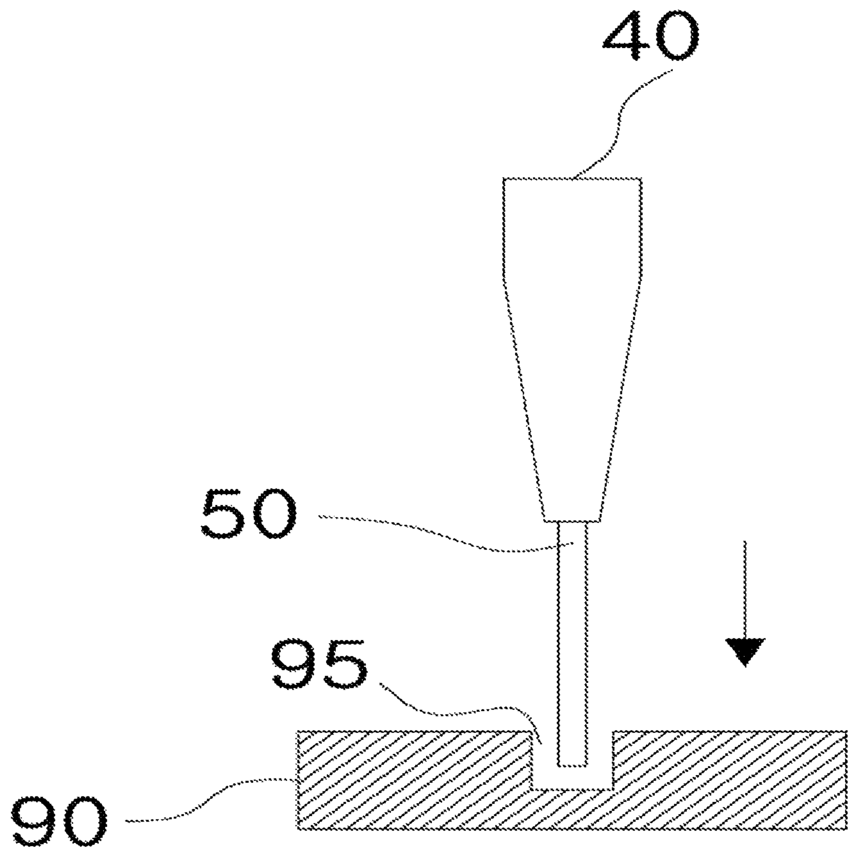
FIG. 4 is an enlarged side view illustrating a method of machining a work-piece using a tool electrode whose one end is mounted on the tool holder as shown in FIG. 3.

FIG. 4 is an enlarged side view illustrating a method of machining a work-piece using a tool electrode whose one end is mounted on the tool holder as shown in FIG. 3.

Since the length of the tool electrode 50 which is exposed outside of the holder housing 10 matches a machining depth of the machining position 95 and the tool electrode 50 vertically pushes a machining position 95 of the work-piece 90 due to the spring (not shown) of the tool holder 40, when the electrochemical discharge machining process is started, a portion around the machining position 95 may be melted by heat generated from the end of the tool electrode 50.

The tool electrode 50 may melt the work-piece 90 using the generated heat of the spark, and may move forward and machine using the spring (not shown) provided in the tool holder 40.

Here, the distance that the tool electrode 50 moves vertically may match the length of the tool electrode 50 which is exposed outside of the holder housing 10. Here, the vertical direction can be the same with a direction of gravity.

Figure 5:
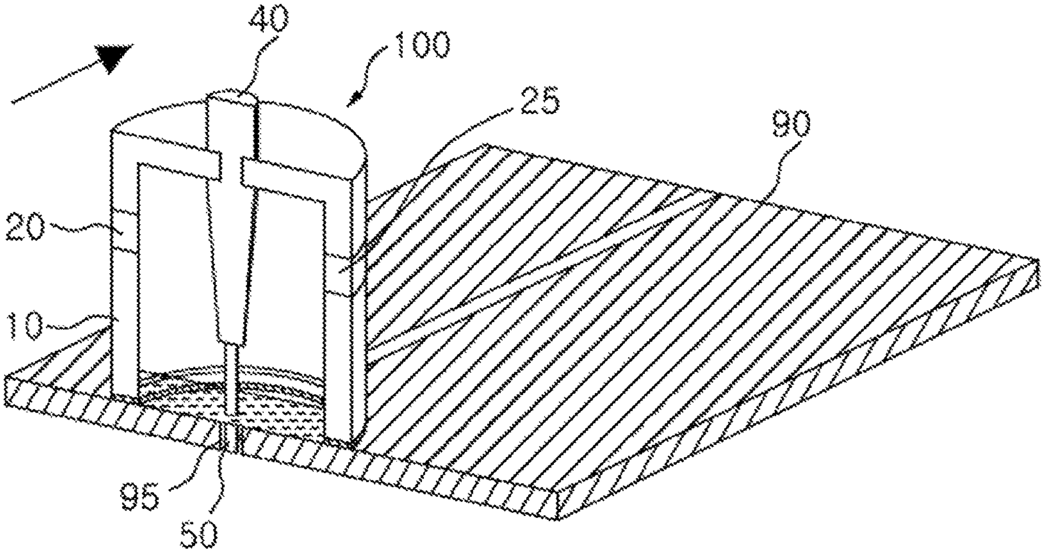
FIG. 5 is a cross-sectional perspective view illustrating a method of machining a work-piece using an electrochemical discharge machining process according to another embodiment of the present disclosure.

FIG. 5 is a cross-sectional perspective view illustrating a method of machining a work-piece using an electrochemical discharge machining process according to another embodiment of the present disclosure.

A machining apparatus 100 including a holder housing 10 in which a electrolyte 30 is accommodated and a tool holder 40 having one side fixed to the holder housing 10 and the other side at which a tool electrode 50 is mounted may be moved to a machining position 95 of the work-piece 90, the electrolyte 30 may be supplied, a counter electrode 60 and the tool electrode 50 may be supplied with a voltage by a power supplier 80, and the electrochemical discharge machining process may be performed.

At this time, when the machining apparatus 100 is moved during the electrochemical discharge machining process, the work-piece 90 having a desired shape may be machined according to a direction in which the machining apparatus 100 is moved.

More specifically, when the desired shape is machined, such as lines to be drawn in a predetermined direction or holes in the work-piece 90, or cutting the work-piece 90, a machining process is performed at the machining position 95 as much as the length of the tool electrode 50 exposed outside of the holder housing 10, and when the machining process is completely performed, the tool electrode 50 of the machining apparatus 100 is pulled out of the machining position 95. Further, the machining apparatus 100 is moved in a direction in which the machining process is required to be performed, an end of the tool electrode 50 is matched to a next machining position 95, and the electrochemical discharge machining process is started again. When this process is repeated, the work-piece 90 may be machined in the desired shape. Here, the length of the tool electrode 50 exposed outside of the holder housing 10 may be matched with a depth of a shape desired to be machined.

According to an aspect of the above-described present disclosure, since the machining apparatus is manually moved to match the machining position of the work-piece to the end of the tool electrode exposed outside of the holder housing, an additional power or tool for controlling the position thereof is not necessary, and since the machining process is performed by the end of the tool electrode exposed outside of the electrolyte tank, the electrochemical discharge machining process can be performed regardless of the size of the work-piece.

In addition, during the electrochemical discharge machining process, the work-piece can be machined in a desired shape by manually moving a position of the machining apparatus.

Even though the present disclosure is described with reference to the above-described exemplary embodiments, it will be apparent to those skilled in the art that various modifications can be made to the above-described exemplary embodiments of the present disclosure without departing from the spirit or scope of the disclosure. Thus, it is intended that the present disclosure covers all such modifications provided they come within the scope of the appended claims and their equivalents.

What is claimed is:

1. An apparatus for an electrochemical discharge machining process, the apparatus comprising:
- a holder housing containing an electrolyte and having,
  - an inlet hole,
  - an outlet hole,
  - a first side, and
  - a second side,
  - wherein the holder housing is configured to sealingly accommodate the electrolyte therein unless at least one of the inlet hole and the outlet hole is open;
- a tool holder disposed at the first side; and
- a first electrode having a first end and a second end, wherein the first end is coupled to the tool holder and the second end passes through the second side.

2. The apparatus of claim 1, further comprising:
- an elastic plate sealingly covering the second side; and
- a second electrode disposed between the elastic plate and the first side and electrically coupled to a power source, wherein the first electrode fluid-tightly passes through both of the elastic plate and the second electrode.

3. The apparatus of claim 2, wherein the holder housing and the second electrode define a space accommodating the electrolyte therein.

4. The apparatus of claim 2, wherein the first electrode is in contact with the electrolyte and the second electrode.

5. The apparatus of claim 1, wherein the tool holder comprises:
- a wire electrically coupling the first electrode to the power source; and
- an elastic member configured to apply an elastic force to the first electrode in a longitudinal direction.

6. The apparatus of claim 5, wherein the longitudinal direction is same direction with a direction of gravity.

7. The apparatus of claim 1, wherein the second end of the first electrode is protruded from the second side in a predetermined distance.

8. The apparatus of claim 1, wherein the holder housing has a cylindrical shape.

9. The apparatus of claim 1, wherein the holder housing is a portable holder housing.

10. The apparatus of claim 1, wherein the holder housing is made of a transparent material.

11. A method for an electrochemical discharge machining process, the method comprising:
- moving a machining apparatus comprising,
  - a holder housing containing an electrolyte therein,
  - a first electrode having a first end and a second end, wherein the first end is disposed inside the holder housing and the second end is protruded from the holder housing, and
  - a second electrode disposed inside the holder housing and being in contact with the first electrode and the electrolyte; and
- machining a work-piece with the second end of the first electrode.

12. The method of claim 11, wherein the first electrode and the second electrode are in contact with the electrolyte and are coupled with a power source.

13. The method of claim 11, wherein the moving further comprises placing the second end of the first electrode at a predetermined position of the work-piece.

14. The method of claim 11, wherein the machining further comprising applying a force to the first electrode in a longitudinal direction.

15. The method of claim 14, wherein the longitudinal direction is same direction with a direction of gravity.

16. The method of claim 14, wherein the second end of the first electrode is protruded from the holder housing in a first depth, and the machining further comprises processing the work-piece for the first depth.

17. The method of claim 11, wherein the moving further comprises relocating the holder housing in a predetermined direction, distance, and/or shape.

18. The method of claim 11, further comprising:
- machining at a first place on the work-piece;
- moving the holder housing in an opposite direction from a longitudinal direction detaching the second end of the electrode from the work-piece;
- relocating a location of the holder housing at a second place of the work-piece; and
- machining at the second place on the work-piece.

19. The method of claim 11, wherein the holder housing is made of a transparent material.

* * * * *